United States Patent
Ashiya et al.

(10) Patent No.: US 9,948,660 B2
(45) Date of Patent: Apr. 17, 2018

(54) COMPUTER SECURITY BASED ON HIERARCHICAL CACHE LATENCY SIGNATURE AUTHENTICATION

(71) Applicant: CA, Inc., New York, NY (US)

(72) Inventors: Himanshu Ashiya, Bangalore (IN); Atmaram Shetye, Mapusa (IN)

(73) Assignee: CA, Inc., New York, NY (US)

(*) Notice: Subject to any disclaimer, the term of this patent is extended or adjusted under 35 U.S.C. 154(b) by 239 days.

(21) Appl. No.: 15/138,482

(22) Filed: Apr. 26, 2016

(65) Prior Publication Data
US 2017/0310683 A1    Oct. 26, 2017

(51) Int. Cl.
| | |
|---|---|
| G06F 7/04 | (2006.01) |
| H04L 29/06 | (2006.01) |
| H04L 29/08 | (2006.01) |
| H04L 12/26 | (2006.01) |
| G06F 15/16 | (2006.01) |

(52) U.S. Cl.
CPC ........ H04L 63/123 (2013.01); H04L 43/0858 (2013.01); H04L 67/2842 (2013.01)

(58) Field of Classification Search
None
See application file for complete search history.

(56) References Cited

U.S. PATENT DOCUMENTS

| | | | |
|---|---|---|---|
| 2010/0250858 A1* | 9/2010 | Cremelie | G06F 17/30159 711/136 |
| 2011/0093925 A1* | 4/2011 | Krishnamoorthy | G06F 21/6218 726/4 |
| 2016/0019148 A1* | 1/2016 | Vekiarides | G06F 12/0811 711/122 |

OTHER PUBLICATIONS

Prabhu et al., "Extracting Device Fingerprints from Flash Memory by Exploiting Physical Variations", *Trust and Trustworthy Computing—4th International Conference—TRUST 2001*, Pittsburgh, PA, Jun. 22-24, 2011, pp. 188-201.

* cited by examiner

*Primary Examiner* — Gary S Gracia
(74) *Attorney, Agent, or Firm* — Sage Patent Group

(57) ABSTRACT

A processor is coupled to a hierarchical memory structure which includes a plurality of levels of cache memories that hierarchically cache data that is read by the processor from a main memory. The processor is integrated within a computer terminal. The processor performs operations that include generating a hierarchical cache latency signature vector by repeating for each of a plurality of buffer sizes, the following: 1) allocating in the main memory a buffer having the buffer size; 2) measuring elapsed time for the processor to read data from buffer addresses that include upper and lower, boundaries of the buffer; and 3) storing the elapsed time and the buffer size as an associated set in the hierarchical cache latency signature vector. The operations further include communicating through a network interface circuit a computer identification message containing computer terminal identification information generated based on the hierarchical cache latency signature vector.

16 Claims, 8 Drawing Sheets

```
TimeTaken GetTimeHierarchicalMemoryLatency (LoopCount, BufferSize, Jump)
    NumberOfIntegersInBuffer = BufferSize/SizeOfInteger
    BufferOfIntegers = AllocateBuffer (NumberOfIntegersInBuffer)
    For each Integer in BufferOfIntegers index i
        BufferOfIntegers[i] = RandomInteger ()

GrandTotal = 0

StartTime = GetCurrentTime ()
    For LoopCount number of times
        TotalSum = 0
            For each Integer in BufferOfIntegers index i
                NewIndex = ((i*Jump) + i) % NumberOfIntegersInBuffer
                TotalSum = TotalSum + BufferOfIntegers [NewIndex]
        GrandTotal = GrandTotal + TotalSum
    EndTime = GetCurrentTime ()

Return (EndTime - StartTime)
```

FIGURE 4

```
GetTimeHierarchicalMemoryLatency 50 307200 262144
GetTimeHierarchicalMemoryLatency 50 409600 262144
GetTimeHierarchicalMemoryLatency 50 512000 262144
GetTimeHierarchicalMemoryLatency 50 614400 262144
GetTimeHierarchicalMemoryLatency 50 716800 262144
GetTimeHierarchicalMemoryLatency 50 819200 262144
GetTimeHierarchicalMemoryLatency 50 921600 262144
GetTimeHierarchicalMemoryLatency 50 1024000 262144

GetTimeHierarchicalMemoryLatency 50 2048000 262144
GetTimeHierarchicalMemoryLatency 50 3072000 262144
GetTimeHierarchicalMemoryLatency 50 4096000 262144
GetTimeHierarchicalMemoryLatency 50 5120000 262144
GetTimeHierarchicalMemoryLatency 50 6144000 262144
GetTimeHierarchicalMemoryLatency 50 7168000 262144
GetTimeHierarchicalMemoryLatency 50 8192000 262144
GetTimeHierarchicalMemoryLatency 50 9216000 262144
GetTimeHierarchicalMemoryLatency 50 10240000 262144

GetTimeHierarchicalMemoryLatency 50 20480000 262144
GetTimeHierarchicalMemoryLatency 50 30720000 262144
GetTimeHierarchicalMemoryLatency 50 40960000 262144
GetTimeHierarchicalMemoryLatency 50 51200000 262144
GetTimeHierarchicalMemoryLatency 50 61440000 262144
GetTimeHierarchicalMemoryLatency 50 71680000 262144
GetTimeHierarchicalMemoryLatency 50 81920000 262144
GetTimeHierarchicalMemoryLatency 50 92160000 262144
GetTimeHierarchicalMemoryLatency 50 102400000 262144
```

FIGURE 5

COMPUTER SECURITY BASED ON HIERARCHICAL CACHE LATENCY SIGNATURE AUTHENTICATION

BACKGROUND

The present disclosure relates to computer security and more particularly to controlling access to protected information based on authentication of computing terminals.

Some content owners desire to restrict some content, such as documents containing confidential information or copyrighted works, to being accessible to only authorized computer terminals. The authorized computer terminals may be allowed access because they are determined to be more secure by design and/or trusted because of a known relationship to authorized users. For example, an authorized terminal may be provided by an employer or may be provided by a user who has registered the terminal for use in accessing the content. Such content owners would need a way to allow the content to be accessible only from computer terminals having a confirmed identity. However, fraudsters have developed sophisticated techniques to obtain credentials of users who are authorized to access content. Some of these fraudsters have moreover developed sophisticated techniques to cause computer terminals operated by the fraudsters to impersonate other computer terminals.

Electronic fingerprinting can be used to collect information about a computer terminal for the purpose of uniquely identifying it. A browser cookie can be stored on a computer terminal to contain information that forms an electronic fingerprint for the computer terminal, however cookies can be prone to tampering and can be discarded at any time by users or blocked by user preferences. An inventory of software versions and types residing on a computer terminal can also be used to form an electronic fingerprint, however software can be frequently updated and deleted by users. There is a need for electronic fingerprinting techniques for computer terminals that can be accurately repeated and beyond user manipulation.

SUMMARY

Some embodiments disclosed herein are directed to a method of performing operations by a processor coupled to a hierarchical memory structure. The hierarchical memory structure includes a plurality of levels of cache memories that hierarchically cache data that is read by the processor from a main memory. The processor is integrated within a computer terminal. The operations include generating a hierarchical cache latency signature vector by repeating for each of a plurality of buffer sizes that include a first buffer size that is smaller than a storage capacity of a lowest level of the cache memories, a second buffer size that is larger than the storage capacity of the lowest level of the cache memories and smaller than a storage capacity of a next higher level of the cache memories, and a third buffer size that is larger than the storage capacity of the next higher level of the cache memories, the following: 1) allocating in the main memory a buffer having the buffer size; 2) measuring elapsed time for the processor to read data from buffer addresses that include upper and lower boundaries of the buffer; and 3) storing the elapsed time and the buffer size as an associated set in the hierarchical cache latency signature vector. The operations further include communicating through a network interface circuit a computer identification message containing computer terminal identification information generated based on the hierarchical cache latency signature vector.

Some other embodiments disclosed herein are directed to a method of performing operations on a processor of a computer authentication node, which include receiving through a network interface circuit a computer identification message containing an initial hierarchical cache latency signature vector that contains associated sets of elapsed times and buffer sizes, the elapsed times indicating how long a processor of a computer terminal took to read data from buffer addresses, which include upper and lower boundaries of each of the buffer sizes, of buffers sequentially allocated in a hierarchical memory structure comprising a plurality of levels of cache memories that hierarchically cache data that is read by the processor from a main memory. The operations further include receiving through the network interface circuit a read request message containing an updated hierarchical cache latency signature vector and a data address that is requested to be read, the updated hierarchical cache latency signature vector containing associated sets of elapsed times and buffer sizes. The operations further include determining whether a computer terminal that generated the read request message is the same as the computer terminal that generated the computer identification message, based on comparison of the initial hierarchical cache latency signature vector to the updated hierarchical cache latency signature vector. The operations further include controlling whether permission is granted for the read request message to read data from the data address, based a result of the determination.

Some other embodiments disclosed herein are directed to a computer program product that includes a non-transitory computer readable storage medium including computer readable program code embodied in the medium that when executed by a processor of a computer terminal causes the processor to perform operations. The operations include generating a hierarchical cache latency signature vector by repeating for each of a plurality of buffer sizes that include a first buffer size that is smaller than a storage capacity of a lowest level of the cache memories, a second buffer size that is larger than the storage capacity of the lowest level of the cache memories and smaller than a storage capacity of a next higher level of the cache memories, and a third buffer size that is larger than the storage capacity of the next higher level of the cache memories, the following: 1) allocating in the main memory a buffer having the buffer size; 2) measuring elapsed time for the processor to read data from buffer addresses that include upper and lower boundaries of the buffer; and 3) storing the elapsed time and the buffer size as an associated set in the hierarchical cache latency signature vector. The operations further include communicating through a network interface circuit a computer identification message containing computer terminal identification information generated based on the hierarchical cache latency signature vector.

Other methods, computer program products, computer terminals, and authentication nodes according to embodiments will be or become apparent to one with skill in the art upon review of the following drawings and detailed description. It is intended that all such additional methods, computer program products, computer terminals, and authentication nodes be included within this description and protected by the accompanying claims.

BRIEF DESCRIPTION OF THE DRAWINGS

Aspects of the present disclosure are illustrated by way of example and are not limited by the accompanying drawings. In the drawings:

FIG. 4 is a listing of computer program instructions for a functional routine that can be called by a processor to measure elapsed time for the processor to read data from buffer addresses that include upper and lower boundaries of a plurality of buffer sizes allocated in a main memory of a hierarchical memory structure, in accordance with some embodiments of the present disclosure;

FIG. 5 illustrates a listing of program calls containing the identified arguments to the functional routine of FIG. 4 in accordance with some embodiments of the present disclosure;

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Various embodiments of the present disclosure are directed to generating information that identifies a computer terminal which is based on the hierarchical cache memory structure coupled to a processor of the computer terminal. The identification information is more particularly based on elapsed times for the processor to read data from different levels of the hierarchical memory structure. As will be explained in further detail below, elapsed times are affected by hardware characteristics and microcode operation of individual cache memory levels and interconnection between the cache memory levels and a main memory. Processors coupled to different numbers of internal and/or external cache layers, different cache memory storage capacities, different read or write cache and/or main memory access speeds, different write polices, different replacement policies, and/or different cache write policy (e.g., write-through or write-back) will have different elapsed times and cause differentiation of identification information for computer terminals having those processors. Moreover, random or intentional process variations during fabrication of the cache memory circuits and control circuitry can affect the elapsed times and result in further differentiation of identification information for computer terminals having those processors. These and more detailed embodiments are explained below for generating identification information that can be used to identify computer terminals.

The identification information for a computer terminal can be registered with an authentication node, which may reside in a content server or another computer terminal, with defined access privileges for use in subsequent authentication of the computer terminal and controlling access by the computer terminal according to the defined access privileges to content that is stored in the content server or the other computer terminal. In this manner, hardware characteristics and microcode operation of a hierarchical cache memory structure of a computer terminal can be used to identify the computer terminal and more securely restrict content accessibility to that particular computer terminal. Moreover, in contrast to prior art approaches for identifying a computer terminal using cookies or software versions stored on the computer terminal, computer terminals can be identified using intrinsic operational performance characteristics of the cache memory structure which cannot be deleted or modified by the user.

Figure 1:
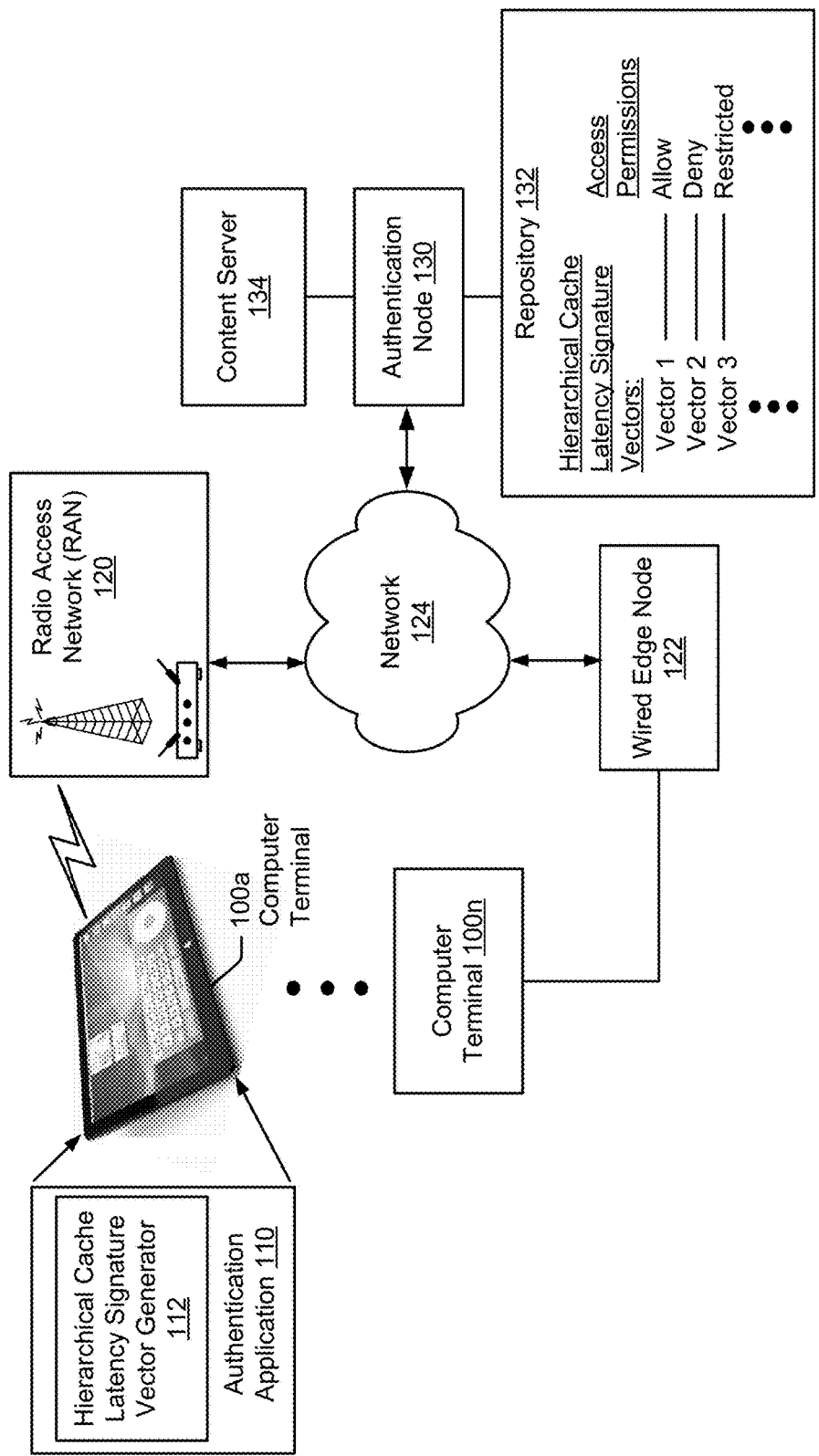
FIG. 1 is a block diagram of a system for authenticating computer terminals using computer terminal identification information that is generated based on unique hierarchical cache latency signature vectors in accordance with some embodiments of the present disclosure.

FIG. 1 is a block diagram of a system for authenticating computer terminals 100a-100n using computer terminal identification information that is generated based on unique hierarchical cache latency signature vectors in accordance with some embodiments of the present disclosure.

Referring to FIG. 1, a user may be able to operate each of the computer terminals 100a-100n (individually referred to as computer terminal 100) to attempt to access content on the content server 134 via one or more radio access networks 120 and/or a wired edge node 122 and a data network 124. At times, the user may operate one or more of the computer terminals 100a-100n simultaneously or in tandem to attempt to access the content. The computer terminal 100 may be any electronic computing device that can communicate through one or more communication networks with the content server 134, including, but not limited to, a desktop computer, a laptop computer, a tablet computer, a mobile phone, a game console, a media player, etc.

In accordance with various embodiments disclosed herein, an authentication node 130 uses computer terminal identification information received from a computer terminal 100 to authenticate the computer terminal 100, and selectively allows or blocks access by the computer terminal 100 to the content on the content server 134 based on a result of the authentication. The content may reside within the content server 140 and/or may be available through the content server 140 from a content provider (e.g., a streaming video subscription operator) and/or may reside on another computer terminal 100 having restricted access controls based on operations explained herein for the authentication node 130.

The computer terminal 100 includes an authentication application 110 having a hierarchical cache latency signature vector generator 112 that is performed by a processor on a hierarchical memory structure that includes a plurality of levels of cache memories that hierarchically cache data that is read by the processor from a main memory. The processor is integrated within the computer terminal 100. The authentication application 110 may be lightweight code provided by the content server 140 or another provider interface for execution by the computer terminal 100 during an on-line session to generate and report the hierarchical cache latency signature vector to the authentication node 130.

Figure 2:
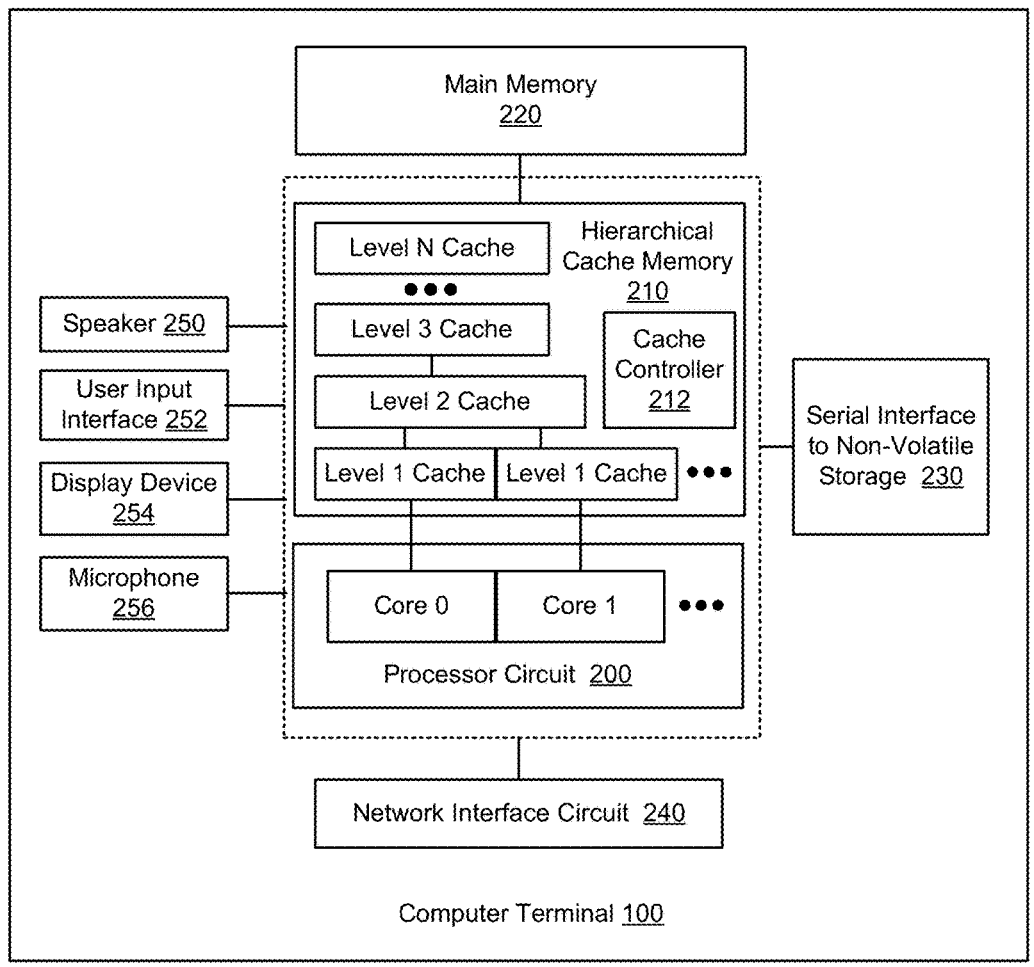
FIG. 2 is a block diagram of a computer terminal that generates computer terminal identification information based on a hierarchical cache latency signature vector in accordance with some embodiments of the present disclosure.
Figure 3:
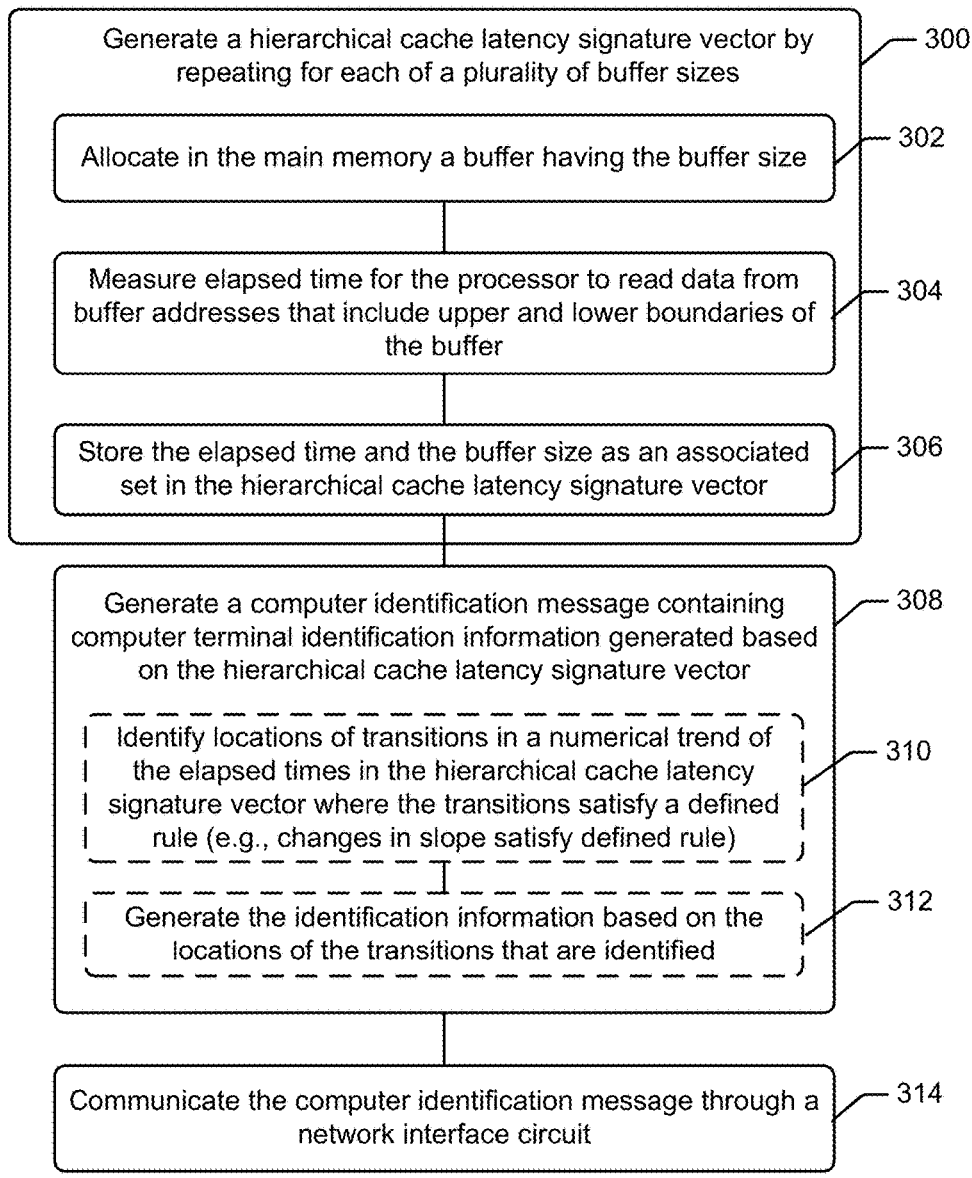
FIG. 3 is a flowchart of operations by a processor coupled to a hierarchical memory structure that includes a plurality of levels of cache memories that hierarchically cache data which is read by the processor from a main memory of a computer terminal in accordance with some embodiments of the present disclosure.

FIG. 2 is a block diagram of a computer terminal 100 that generates computer terminal identification information based on a hierarchical cache latency signature vector in accordance with some embodiments of the present disclosure. FIG. 3 is a flowchart of operations by a processor circuit 200 coupled to a hierarchical memory structure that includes a hierarchical cache memory 210 having a plurality of levels of cache memories that hierarchically cache data which is read by the processor 200 from a main memory 220 of the computer terminal 200 in accordance with some embodiments of the present disclosure. The hierarchical memory structure may furthermore include non-volatile storage devices their external to the computer terminal 100 but coupled thereto through a serial interface 230. Example non-volatile storage devices coupled through serial interface 230 can include, but are not limited to, external solid-state drives (e.g., flash memory based drives), magnetic disk drives, and optical disk drives.

Referring to nonlimiting embodiments shown in FIG. 2, the illustrated processor 200 includes a plurality of parallel processing instruction execution core circuits (e.g., Core 0, Core 1, etc.). The illustrated hierarchical cache memory 210 includes two Level 1 cache memory circuits, each correspondingly coupled to a different one of the core circuits to cache data read by the respective core circuit from the main memory 220. The illustrated hierarchical cache memory 210 has higher level cache memory circuits that include Level 2 cache, Level 3 cache, and Level N cache which hierarchically cache data that is read by anyone of the core circuits from the main memory 220.

A cache controller 212 controls different write polices and/or different replacement policies. Responsive to one of core circuits initiating a read cycle for an address, the cache controller 212 checks the Level 1 cache first, which can have the fastest access but also the smallest storage capacity relative to higher level cache memory circuits; if the data is stored in the Level 1 cache (i.e., a cache hit), the data is read from the Level 1 cache and provided to the core circuit. In contrast, when the data is not stored in the Level 1 cache, the cache controller 212 checks the Level 2 cache, which can have the next fastest access but also the next smallest storage capacity relative to higher level cache memory circuits; if the data is stored in the Level 2 cache (i.e., a cache hit), the data is read from the Level 2 cache and provided to the core circuit. When the data is not stored in the Level 2 cache, the cache controller 212 repeats this process of checking higher levels of the cache memories until the data is read from a higher cache level or, if not stored in any of the cache memory levels, the data is read from the main memory 220 and provided to the core circuit and stored in one or more of the cache memory levels depending upon the write policies and/or replacement policies followed by operations by the cache controller 212.

The computer terminal 100 further includes a network interface circuit 240 that can communicate with the authentication node 130 via one or more data networks and intervening radio access networks 120 and/or wired edge nodes 122. The computer terminal 100 may further include a speaker 250, a user input interface 252 (e.g., keyboard, touch sensitive display, etc.), display device 254, and/or a microphone 256.

Reference is now made to FIG. 3 which illustrates operations by the processor 200 for generating a hierarchical cache latency signature vector which is used to identify the computer terminal 100 in accordance with some embodiments of the present disclosure. The operations may be defined by program code of the hierarchical cache latency signature vector generator 112 of authentication application 110 performed by the processor 200. The processor 200 generates (block 300) the hierarchical cache latency signature vector by repeating for each of a plurality of different buffer sizes the operations shown in blocks 302-306. The plurality of buffer sizes include a first buffer size that is smaller than a storage capacity of a lowest level of the cache memories (i.e., Level 1 cache), a second buffer size that is larger than the storage capacity of the lowest level of the cache memories (i.e., Level 1 cache) and smaller than a storage capacity of a next higher level of the cache memories (i.e., Level 2 cache), and a third buffer size that is larger than the storage capacity of the next higher level of the cache memories (i.e., Level 2 cache).

When there are more levels of cache memories, e.g., Levels 3 through N, the plurality of different buffer sizes can include more buffer sizes. For example, the third buffer size can be larger than the storage capacity of the next higher level of the cache memories (i.e., Level 2 cache) and smaller than a storage capacity of a next higher level of the cache memories i.e., Level 3 cache). A fourth buffer size can be larger than the storage capacity of the next higher level of the cache memories (i.e., Level 3 cache) and smaller than a storage capacity of a next higher level of the cache memories (i.e., Level N cache).

For each of the defined buffer sizes, the processor 200 repeats operations to: 1) allocate (block 302) in the main memory 220 a buffer having the buffer size; 2) measure (block 304) elapsed time for the processor 200 to read data from buffer addresses that include upper and lower boundaries of the buffer; and 3) store (block 306) the elapsed time and the buffer size as an associated set in the hierarchical cache latency signature vector.

The processor 200 then generates (block 308) a computer identification message containing computer terminal identification information that is generated based on content of the hierarchical cache latency signature vector.

The processor 200 may repeat the operations of blocks 302-306 a defined plural number of times to repetitively measure the elapsed time for the processor to read data from buffer addresses that include upper and lower boundaries of the buffer. After completing the defined number of repetitions, the processor 200 can combine the elapsed times from the repeated measurements to generate the elapsed time that is stored with the buffer size as an associated set in the hierarchical cache latency signature vector. For example, the elapsed times from the repeated measurements can be averaged to generate an average elapsed time for the processor 200 to read data across the range of the buffer size. Combining the elapsed times from the repeated measurements in this manner can provide a more accurately repeatable resulting elapsed time value for storage in the hierarchical cache latency signature vector. Consequently, the same computer terminal 100 can repetitively generate a substantially identical hierarchical cache latency signature vector at spaced apart times, which enables the hierarchical cache latency signature vector to be used to generate computer terminal identification information for use in identifying the computer terminal 100.

The processor 200 communicates (block 314) through the network interface circuit 240 the computer identification message containing the computer terminal identification information generated based on the hierarchical cache latency signature vector. As will be explained below regarding further embodiments, the computer identification message can be communicated to the authentication node 130 which may be coupled to the content server 134 and/or which may be coupled to or at least partially disposed within another computer terminal, e.g., terminal 100n.

In one embodiment, the authentication application 110 may operate to control the processor 100 to lock to a single one of the instruction processing cores, e.g., to one of core 0, core 1, etc., processing of instructions performing the operations for generating a hierarchical cache latency signature vector. Because the illustrated processor 100 has a plurality of instruction processing cores it may be advantageous to lock the instructions for generating the hierarchical cache latency signature vector, e.g., generator 112, to a single core so that its instructions are serially processed by the single core. If the instructions are not forced to be serially processed by the single core but instead are allowed to be processed by a plurality of different processing threads through a plural number of the processing cores, the multi-threading management microcode of the processor 200 may introduce randomness and consequential variability between repetitions of the measurements (block 304) of the elapsed times. Such variability in measurements between repetitions may decrease the ability for the computer terminal 100 to generate a substantially identical hierarchical cache latency signature vector from repetitions performed at spaced apart times, which can decrease the usefulness of the hierarchical cache latency signature vector to be used to identify the computer terminal 100.

In some further embodiments, the operations for generating (block 308) a computer identification message can include identifying locations where transitions in a numerical trend through associated sets of the elapsed times and the buffer sizes in the hierarchical cache latency signature vector satisfy a defined rule. The locations of the transitions which satisfy the defined rule can identify which corresponding ones of the buffer sizes caused the processor to read some data from a lower one of the cache memories and to read other data from a higher one of the cache memories or the main memory. The computer terminal identification information can then be generated based on the locations of the transitions that are identified, and the computer identification message can be generated to contain the computer terminal identification information.

In a further embodiment, the operations to identify the locations where transitions in the numerical trend through associated sets of the elapsed times and the buffer sizes in the hierarchical cache latency signature vector satisfy the defined rule, can include identifying locations where slopes of the numerical trend through associated sets of the elapsed times and the buffer sizes in the hierarchical cache latency signature vector change by a threshold value determined based on the defined rule.

These and further related embodiments are now explained with regard to the nonlimiting example program code shown in FIGS. 4 and 5 and the graphical illustrations of elapsed time measurements versus buffer size for three computer terminals having different hierarchical memory structures which result in a definable differences between the graphs which be used to identify each of the three computer terminals.

FIG. 4 is a listing of computer program instructions for a functional routine that can be called by the processor 200 to measure elapsed time for the processor 200 to read data from buffer addresses that include upper and lower boundaries of a plurality of buffer sizes allocated in the main memory 220 of a hierarchical memory structure, in accordance with some embodiments of the present disclosure. FIG. 5 illustrates a listing of program calls containing the identified arguments to the functional routine of FIG. 4 in accordance with some embodiments of the present disclosure.

Referring to FIGS. 4 and 5, a functional routine named "GetTimeHierarchicalMemoryLatency" measures the elapsed time for the processor 200 to read data from data addresses that are spaced apart across a defined buffer size (BufferSize) by data address distance (Jump). The operations are repeated a defined number of times (LoopCount). A number of integers for a buffer is determined as the BufferSize divided by the size of each integer (SizeOfInteger), e.g., 64 bits. A buffer having the number of integers is allocated in the main memory 220 (AllocateBuffer(NumberOfIntegers)). For the defined number of repetitions (LoopCount), the elapsed time between a start time (StartTime) and an end time (EndTime) is measured for the processor to read each integer at data address locations in the allocated buffer that are spaced apart by the defined data address distance (Jump). The size of the buffers which are sequentially allocated and the size of the data address distance (Jump) between which data address locations are read, are defined to cause some of the data reads to occur as cache hits on different ones of the levels of cache memories and the main memory 220. Example argument values for "LoopCount", "BufferSize", and "Jump" are shown in the listing of program calls in FIG. 5.

Figure 6:
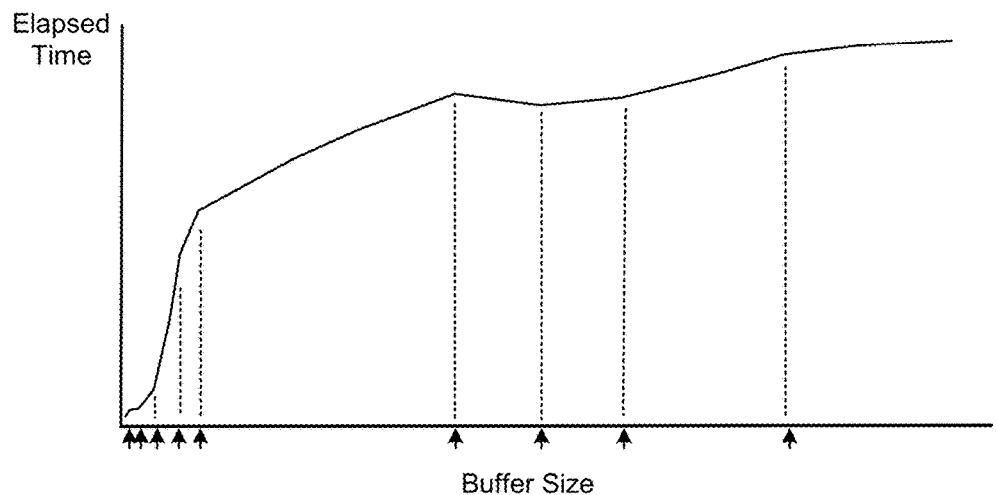
FIGS. 6, 7, and 8 illustrate graphs of numerical trends through associated sets of elapsed times and buffer sizes in hierarchical cache latency signature vectors that are respectively generated by three processors having different hierarchical memory structures performing the functional routine of FIG. 4 using the arguments of FIG. 5 in accordance with some embodiments of the present disclosure.
Figure 7:
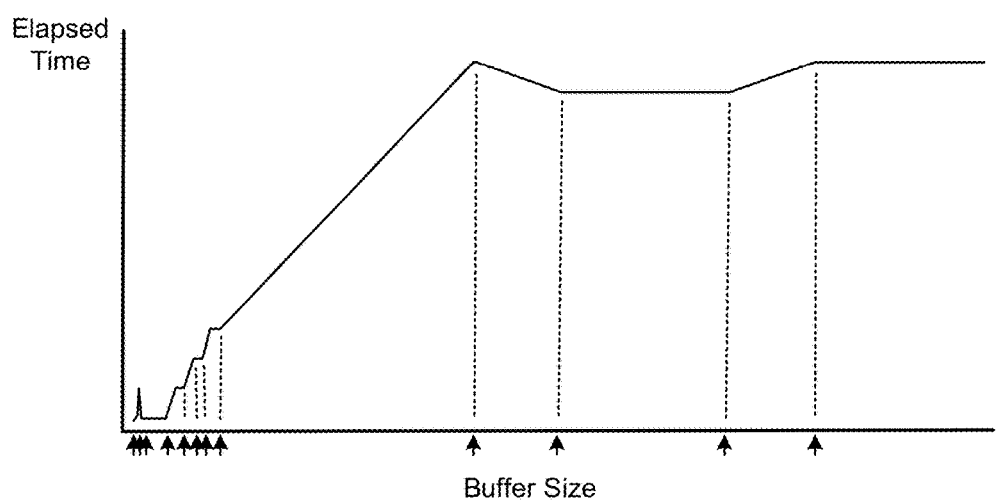
Figure 8:
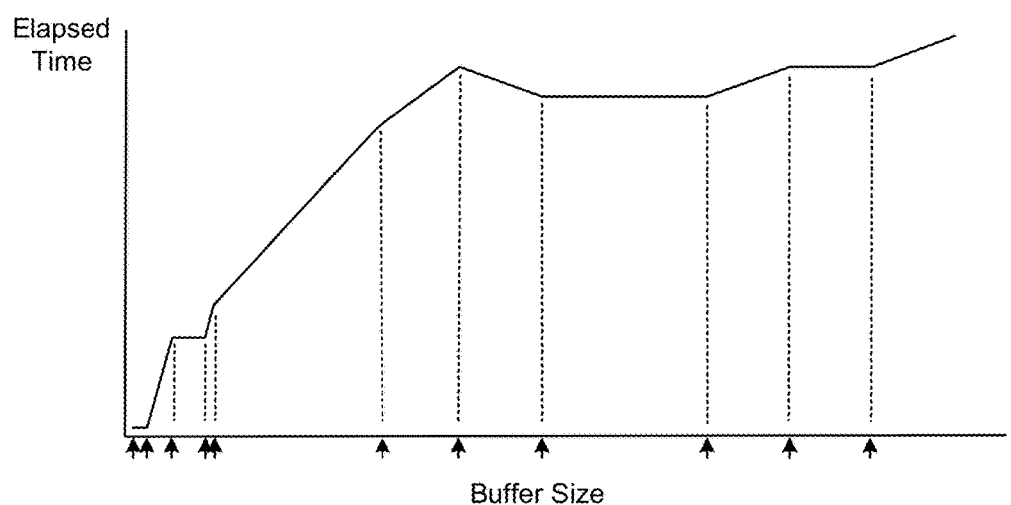

FIGS. 6, 7, and 8 illustrate graphs of numerical trends through associated sets of elapsed times and buffer sizes in hierarchical cache latency signature vectors that are respectively generated by three different computer terminals having processors coupled to different hierarchical memory structures performing the function of FIG. 4 using the arguments of FIG. 5 in accordance with some embodiments of the present disclosure.

The numerical trends illustrated in the FIGS. 6, 7, and 8 are different because the hierarchical cache latency signature vectors of each of the three terminals are different, due to, for example, different numbers of internal and/or external cache layers, different cache memory storage capacities, different read or write cache and/or main memory access speeds, different write polices, different replacement policies, and/or different cache write policy (e.g., write-through or write-back) resulting in different elapsed times. Moreover, random or intentional process variations during fabrication of the cache memory circuits and control circuitry, e.g., cache controller 212, can affect the elapsed times and result in further differentiation between the hierarchical cache latency signature vectors.

FIG. 6 illustrates the numerical trend through associated sets of the elapsed times and the buffer sizes in the hierarchical cache latency signature vector which is generated for a first computer terminal. The illustrated numerical trend shows that the briefest elapsed times occur when the processor is reading data from a plurality of buffer addresses, of a buffer allocated in the main memory 220, extending between boundaries of the smaller buffer sizes toward the left side of the graph. In contrast, the longest elapsed times occur when the processor is reading data from a plurality of buffer addresses, of a buffer allocated in the main memory 220, extending between boundaries of the larger buffer sizes toward the right side of the graph. The elapsed times do not change linearly with buffer size, but instead have identifiable locations where transitions occur in the slope of the numerical trend through associated sets of the elapsed times and the buffer sizes in the initial hierarchical cache latency signature vector satisfy a defined rule. Locations of at least some of these transitions are illustrated in FIG. 6 by the upward facing arrows along the buffer size axis.

The locations of the transitions correspond to which adjacent ones of the buffer sizes caused changes in where the processor 200 is provided data from a read operation. For example, one buffer size causes the processor 200 to read some data from a lower one of the cache memories (e.g., the Level 1 cache) and to read other data from a higher one of the cache memories (e.g., the Level 2 cache) or the main memory 220. Following the numerical trend from the left to the right, the early smaller allocated buffer sizes enable the processor 200 to perform read operations entirely within the Level 1 cache, after the cache controller 212 stores the initial cycle of data read from the small size allocated buffer in the main memory 220 in the Level 1 cache. As the buffer sizes increase further beyond the storage capacity of the Level 1 cache, the processor 200 begins to have Level 1 cache misses for some of the data that is read and resulting in delays as the data is read from the Level 2 cache. As the buffer sizes increase further beyond the storage capacity of the Level 2 cache, the processor 200 begins to have Level 1 cache and Level 2 cache misses for some of the data that is read and resulting in delays as the data is read from the Level 3 cache. As the buffer sizes increase further beyond the storage capacity of the Level 3 cache, the processor 200 begins to have Level 1 cache, Level 2 cache, and Level 3 misses for some of the data that is read and resulting in delays as the data is read from the higher level N cache(s) or the main memory 220. These increasing levels of cache misses with the associated slower access times of the higher level cache memory circuits and the main memory 220 results in increasing elapsed times. Other transitions in the numerical trends can occur where the repetitive sequential read operations across the various allocated buffer sizes trigger different write polices, different replacement policies, and/or different cache write policy (e.g., write-through or write-back) performed by micro-code operations of the cache controller 212.

FIG. 7 illustrates the numerical trend through associated sets of the elapsed times and the buffer sizes in the hierarchical cache latency signature vector which is generated for a second computer terminal. The number of transitions and the locations of where the transitions in the numerical trend of FIG. 7 satisfy the defined rule are much different than what is illustrated in FIG. 6.

FIG. 8 illustrates the numerical trend through associated sets of the elapsed times and the buffer sizes in the hierarchical cache latency signature vector which is generated for a third computer terminal. The number of transitions and the locations of where the transitions in the numerical trend of FIG. 8 satisfy the defined rule are much different than what is illustrated in FIGS. 6 and 7.

In accordance with some embodiment, the number of transitions and/or the locations of where the transitions in the numerical trend through associated sets of the elapsed times and the buffer sizes in the hierarchical cache latency signature vector generated for a computer terminal are used to generate computer terminal identification information which can uniquely identify one computer terminal from another computer terminal.

In some embodiments, the computer terminal 100 operates to determine the number of transitions and/or the locations of where the transitions in the numerical trend through associated sets of the elapsed times and the buffer sizes in the hierarchical cache latency signature vector satisfy a defined rule, and which are used to generate computer terminal identification information to uniquely identify one computer terminal from another computer terminal.

In some other embodiments, the authentication node 130 receives an updated hierarchical cache latency signature vector from a computer terminal and compares a numerical trend through the sets of the elapsed times and the buffer sizes in the updated hierarchical cache latency signature vector to a numerical trend through the sets of the elapsed times and the buffer sizes in an earlier received hierarchical cache latency signature vector.

Figure 9:
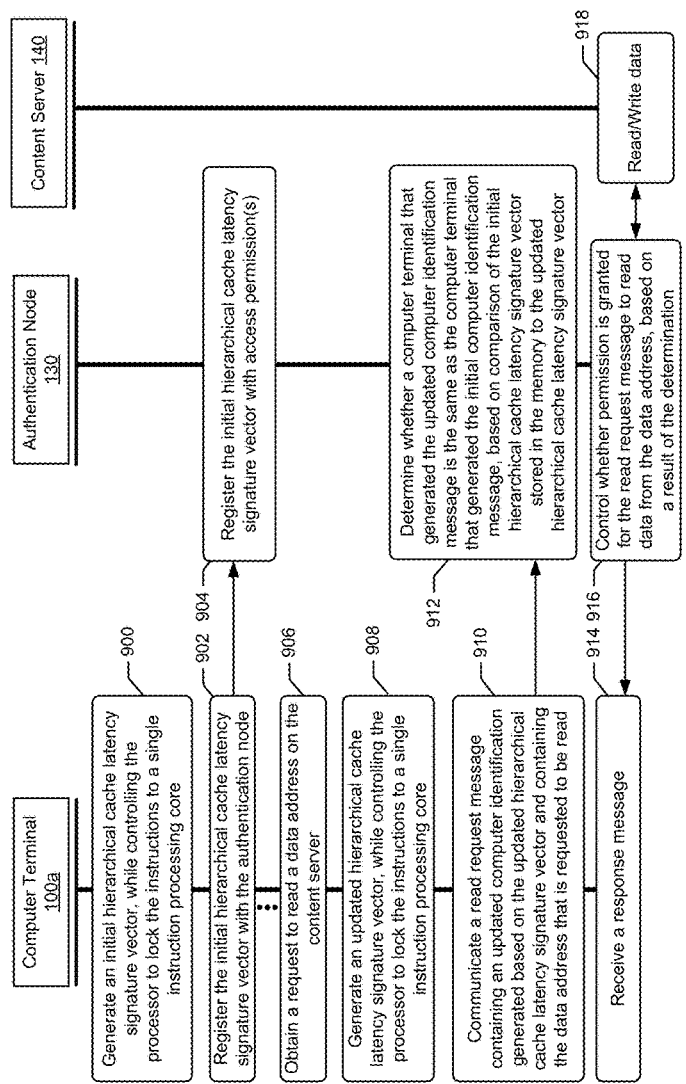
FIG. 9 is a combined data flow diagram and flowchart of operations by a computer terminal, an authentication node, and a content server that control access by the computer terminal to data on the content server based on computer terminal identification information that is generated based on a hierarchical cache latency signature vector, in accordance with some embodiments of the present disclosure.

These and related embodiments are explained with regard to FIG. 9, which is a combined data flow diagram and flowchart of operations by a computer terminal 100a, an authentication node 130, and a content server 140 that control access by the computer terminal 100a to data on the content server 140 based on computer terminal identification information that is generated based on a hierarchical cache latency signature vector, in accordance with some embodiments of the present disclosure.

Referring to FIG. 9, the computer terminal 100a generates (block 900) an initial hierarchical cache latency signature vector, e.g., via the operations of blocks 300-306 of FIG. 3, while controlling the processor 200 to lock instructions for the operations to a single one of the instruction processing cores (i.e., preventing multi-threading of the instructions). The computer terminal 100a communicates a computer identification message or registration message to register (block 902) the initial hierarchical cache latency signature vector with the authentication node 130. Although the authentication node 130 is illustrated as being separate from the content server 140, its functionality may be at least partially incorporated within the content server 140.

In one embodiment, the authentication node 130 receives the initial hierarchical cache latency signature vector in a registration request message that also contains a computer terminal identifier. The authentication node 130 uses the computer terminal identifier to select a set of buffer sizes from among sets of buffer sizes in a repository. The authentication node 130 then communicates a registration response message directed to computer terminal 100a having the computer terminal identifier, where the registration response message contains the set of buffer sizes that was selected. The authentication node 130 subsequently receives the computer identification message containing the initial computer identification responsive to the communication of the registration response message, where the initial computer identification was generated by the computer terminal 100a based on the operations of blocks 300-306 of FIG. 3 using the set of buffer sizes contained in the registration response message. The authentication node 130 performs registration operations (block 904) to store the initial hierarchical cache latency signature vector in a repository memory with a logical association to the computer terminal identifier, for subsequent use in authenticating whether a subsequently received message containing an updated hierarchical cache latency signature vector was generated by the same computer terminal that was registered (block 904).

The computer terminal 108 may communicate the initial hierarchical cache latency signature vector to the authentication node 130 responsive to receiving an authentication challenge message through the network interface circuit from the authentication node 130. The initial hierarchical cache latency signature vector can then be communicated as content of an authentication response to the authentication challenge message. The authentication challenge message can contain information defining a set of buffer sizes selected by the authentication node 130, and the computer terminal 100*a* can generate a hierarchical cache latency signature vector using the set of buffer sizes defined by the information contained in the authentication challenge message.

The authentication node 130 registers (block 94) the initial hierarchical cache latency signature vector with access permission(s) that is to be granted to the computer terminal 100*a* for accessing data stored on the content server 140. The authentication node 130 can generate the repository 132 shown in FIG. 1 where hierarchical cache latency signature vectors received from different computer terminals are stored with logical associations to the access permissions that are granted thereto. In the example repository 132 shown in FIG. 1, a computer terminal that generates the hierarchical cache latency signature Vector 1 is "allowed" to access data on the content server 134. Another computer terminal that generates the hierarchical cache latency signature Vector 2 is "denied" access to data, i.e., blocked from accessing data, on the content server 134. Still another computer terminal that generates the hierarchical cache latency signature Vector 3 is granted "restricted" access to data, e.g., allowed to access data stored at only certain defined location(s), on the content server 134.

The computer terminal 100*a* subsequently obtains (block 906), e.g., receives from another hosted application or process, a request to read a data address on the content server 140. The computer terminal 100*a* then responsively generates (block 908) an updated hierarchical cache latency signature vector, e.g., via the operations of blocks 300-306 of FIG. 3, while again controlling the processor 200 to lock instructions for the operations to a single one of the instruction processing cores (i.e., preventing multi-threading of the instructions).

The computer terminal 100*a* communicates (block 910) a read request message containing an updated computer identification generated based on the updated hierarchical cache latency signature vector and containing the data address that is requested to be read. The authentication node 130 receives the read request message and determines (block 912) whether a computer terminal to generate the updated computer identification message is the same as a computer terminal that generated the initial computer identification message, based on comparison of the initial hierarchical cache latency signature vector stored in memory of the authentication node 130 to the updated hierarchical cache latency signature vector received in the read request message.

The authentication node 130 controls (block 916) whether permissions granted for the read request message to read data from the data address, based on a result of the determination (block 912). In one embodiment, responsive to determining (block 912) that the initial hierarchical cache latency signature vector has a threshold level of similarity to the updated hierarchical cache latency signature vector, the authentication node 130 initiates reading (block 918) of the data from the content server 140 using the data address, and communicates (block 916) a data response message containing the data read from the content server 140 through the network interface toward the computer terminal 100*a* that generated the read request message. The computer terminal 108 receives (block 914) the data response message and provides the data to the application or other process the requested the read operation. In sharp contrast, the authentication node 130 responds to determining (block 912) that the initial hierarchical cache latency signature vector does not have a threshold level of similarity to the updated hierarchical cache latency signature vector, by discarding the data response message without reading the data addressed by the data address from the content server 140.

The authentication node 130 may determine (block 912) whether the computer terminal that generated the read request message is the same as the computer terminal that generated the computer identification message, by comparing similarity of a numerical trend through associated sets of the elapsed times and the buffer sizes in the initial hierarchical cache latency signature vector to a numerical trend through associated sets of the elapsed times and the buffer sizes in the updated hierarchical cache latency signature vector.

The comparison of similarity of the numerical trend through associated sets of the elapsed times and the buffer sizes in the initial hierarchical cache latency signature vector to the numerical trend through associated sets of the elapsed times and the buffer sizes in the updated hierarchical cache latency signature vector, can include: 1) identifying a first set of locations where transitions in the numerical trend through associated sets of the elapsed times and the buffer sizes in the initial hierarchical cache latency signature vector satisfy a defined rule; 2) identifying a second set of locations where transitions in the numerical trend through associated sets of the elapsed times and the buffer sizes in the updated hierarchical cache latency signature vector satisfy the defined rule; and 3) determining whether the first set of locations are within a threshold distance of the second set of locations.

The operations to identify a first set of locations where transitions in the numerical trend through associated sets of the elapsed times and the buffer sizes in the initial hierarchical cache latency signature vector satisfy the defined rule, can include identifying locations where slopes of the numerical trend through the associated sets of the elapsed times and the buffer sizes in the initial hierarchical cache latency signature vector change by a threshold value determined based on the defined rule. Similarly, the operations to identify a second set of locations where transitions in the numerical trend through associated sets of the elapsed times and the buffer sizes in the updated hierarchical cache latency signature vector satisfy the defined rule, can include identifying locations where slopes of the numerical trend through the associated sets of the elapsed times and the buffer sizes in the updated hierarchical cache latency signature vector change by the threshold value determined based on the defined rule.

In some further embodiments, a processor 200 of a computer terminal 100 performs various of the operations shown in FIG. 3 to generate the computer identification message based on the hierarchical cache latency signature vector responsive to operations to establish a communication session. In one embodiment, responsive to operations to establish a communication session through the network interface circuit with a network node, such as the authentication node 130, the processor 200 of the computer terminal 100 performs the operations of block 300 of FIG. 3 to generate a hierarchical cache latency signature vector as an initial hierarchical cache latency signature vector. The processor 200 obtains a session identifier for the communication session, and communicates the computer identification message containing the initial hierarchical cache latency signature vector and the session identifier through the network interface circuit toward the network node.

Responsive to a request to communicate information through the communication session to the network node, the processor 200 of the computer terminal 100 performs the operations of block 300 of FIG. 3 to generate a hierarchical cache latency signature vector as an updated hierarchical cache latency signature vector, and communicates the computer identification message containing the updated hierarchical cache latency signature vector, the session identifier, and the information.

In a further embodiment, responsive to the operations to establish the communication session through the network interface circuit with the network node, the processor 200 of the computer terminal 100 performs the following to be concurrent in time with operation of a Session Initiation Protocol to establish the communication session with the network node: 1) the performing the generating a hierarchical cache latency signature vector to output an initial hierarchical cache latency signature vector; 2) the obtaining a session identifier for the communication session; and 3) the performing the communicating through the network interface circuit directed toward a content server, the computer identification message containing the initial hierarchical cache latency signature vector and the session identifier through the network interface circuit toward the network node.

Corresponding operations that can be performed by the authentication node 130, the content server 140, or another network node can include responsive to operations to establish a communication session through a network interface circuit with a computer terminal 100, obtaining a session identifier for the communication session, performing the receiving through a network interface circuit a computer identification message, and storing the initial hierarchical cache latency signature vector in memory (e.g., the repository 132 of FIG. 1) with a logical association to the session identifier.

The authentication node 130 can respond to receipt from the computer terminal 100 of a read request message containing an updated hierarchical cache latency signature vector and a data address that is requested to be read, by operations that include: 1) identifying a session identifier for a communication session through which the read request message is received; and 2) retrieving the initial hierarchical cache latency signature vector from the memory using the session identifier for the communication session through which the read request message is received. The authentication node 130 can determine (e.g., block 912 of FIG. 9) whether a computer terminal that generated the read request message is the same as the computer terminal that generated the computer identification message (e.g., block 904 of FIG. 9), based on comparing the initial hierarchical cache latency signature vector, which was retrieved from the memory (e.g., the repository 132) using the session identifier for the communication session through which the data request message is received, to the updated hierarchical cache latency signature vector. The authentication node 130 may initiate the operations to obtain a session identifier for the communication session and initiate the operations to performing the receiving of the computer identification message through the network interface circuit, to be performed concurrent in time with operations of a Session Initiation Protocol to establish the communication session with the computer terminal 100.

Figure 10:
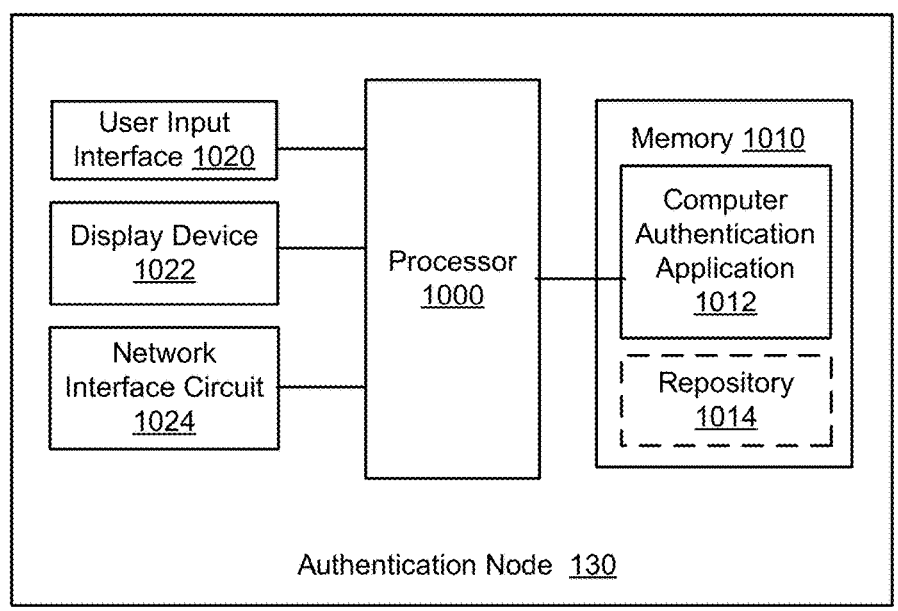
FIG. 10 is a block diagram of an authentication node that is configured according to some embodiments of the present disclosure.

FIG. 10 is a block diagram of an authentication node 130 that is configured according to some embodiments of the present disclosure. Referring to FIG. 10, the authentication node 130 includes a processor 1000, a memory 1010, and a network interface circuit 1024 which can communicate with communication terminals via one or more data networks.

The network interface circuit 1024 may include, for example, a radio access transceiver that provides an air communication link having a communication protocol based on 3GPP LTE or other cellular transceiver, WLAN (IEEE 802.11), WiMax, or other radio communication protocol. The network interface circuit 1024 may alternatively or additionally include a wired network interface, such as Ethernet.

The processor 1000 may include one or more data processing circuits, such as a general purpose and/or special purpose processor (e.g., microprocessor and/or digital signal processor) that may be collocated or distributed across one or more networks. The processor 1000 may include one or more instruction processor cores. The processor 1000 is configured to execute computer program code in the memory 1010, described below as a non-transitory computer readable medium, to perform at least some of the operations described herein as being performed by an authentication node 130, and may further perform operations described herein as being performed by the content server 140. The authentication node 130 may further include a user input interface 1020 (e.g., touch screen, keyboard, keypad, etc.) and a display device 1022.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java. JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:
1. A method comprising:
performing operations as follows on a processor of a computer authentication node within a communication network:

receiving from a computer terminal over the communication network, through a network interface circuit a computer identification message containing an initial hierarchical cache latency signature vector that contains associated sets of elapsed times and buffer sizes, the elapsed times indicating how long a processor of the computer terminal took to read data from buffer addresses, which include upper and lower boundaries of each of the buffer sizes, of buffers sequentially allocated in a hierarchical memory structure comprising a plurality of levels of cache memories that hierarchically cache data that is read by the processor from a main memory, receiving, from the computer terminal over the communication network, through the network interface circuit a read request message containing an updated hierarchical cache latency signature vector and a data address that is requested to be read, the updated hierarchical cache latency signature vector containing associated sets of elapsed times and buffer sizes, determining whether a computer terminal that generated the read request message is the same as the computer terminal that generated the computer identification message, based on comparison of the initial hierarchical cache latency signature vector to the updated hierarchical cache latency signature vector, and controlling whether permission is granted for the read request message to read data from the data address, based a result of the determination.

2. The method of claim 1, wherein the controlling whether permission is granted for the read request message to read data from the data address, based a result of the determination, comprises:

responsive to determining that the initial hierarchical cache latency signature vector has a threshold level of similarity to the updated hierarchical cache latency signature vector,
reading data from a content server using the data address, and
communicating a data response message containing the data read from the content server through the network interface circuit toward the computer terminal that generated the read request message; and responsive to determining that the initial hierarchical cache latency signature vector does not have a threshold level of similarity to the updated hierarchical cache latency signature vector,
discarding the data response message without reading the data addressed by the data address from the content server.

3. The method of claim 1, wherein the determining whether a computer terminal that generated the read request message is the same as the computer terminal that generated the computer identification message, based on comparison of the initial hierarchical cache latency signature vector to the updated hierarchical cache latency signature vector, comprises:

comparing similarity of a numerical trend through associated sets of the elapsed times and the buffer sizes in the initial hierarchical cache latency signature vector to a numerical trend through associated sets of the elapsed times and the buffer sizes in the updated hierarchical cache latency signature vector.

4. The method of claim 3, wherein the comparing similarity of a numerical trend through associated sets of the elapsed times and the buffer sizes in the initial hierarchical cache latency signature vector to a numerical trend through associated sets of the elapsed times and the buffer sizes in the updated hierarchical cache latency signature vector, comprises:

identifying a first set of locations where transitions in the numerical trend through associated sets of the elapsed times and the buffer sizes in the initial hierarchical cache latency signature vector satisfy a defined rule;

identifying a second set of locations where transitions in the numerical trend through associated sets of the elapsed times and the buffer sizes in the updated hierarchical cache latency signature vector satisfy the defined rule; and determining whether the first set of locations are within a threshold distance of the second set of locations.

5. The method of claim 4, wherein:

the identifying a first set of locations where transitions in the numerical trend through associated sets of the elapsed times and the buffer sizes in the initial hierarchical cache latency signature vector satisfy a defined rule,
comprises identifying locations where slopes of the numerical trend through the associated sets of the elapsed times and the buffer sizes in the initial hierarchical cache latency signature vector change by a threshold value determined based on the defined rule; and the identifying a second set of locations where transitions in the numerical trend through associated sets of the elapsed times and the buffer sizes in the updated hierarchical cache latency signature vector satisfy the defined rule,
comprises identifying locations where slopes of the numerical trend through the associated sets of the elapsed times and the buffer sizes in the updated hierarchical cache latency signature vector change by the threshold value determined based on the defined rule.

6. The method of claim 1, wherein the operations performed by the processor of the computer authentication node further comprise:

receiving a registration request message containing a computer terminal identifier;
selecting a set of buffer sizes from among sets of buffer sizes based on the computer terminal identifier;
communicating a registration response message directed to the computer terminal identifier, the registration response message containing the set of buffer sizes that was selected;
receiving the computer identification message responsive to the communication of the registration response message; and
storing the initial hierarchical cache latency signature vector in memory with a logical association to the computer terminal identifier.

7. The method of claim 1, wherein the operations performed by the processor of the computer authentication node further comprise:

responsive to operations to establish a communication session through the network interface circuit with a computer terminal,
obtaining a session identifier for the communication session,
performing the receiving through a network interface circuit of a computer identification message, and storing the initial hierarchical cache latency signature vector in memory with a logical association to the session identifier, wherein the receiving through the network interface circuit a read request message containing an updated hierarchical cache latency signature vector and a data address that is requested to be read, comprises:

identifying a session identifier for a communication session through which the read request message is received; and retrieving the initial hierarchical cache latency signature vector from the memory using the session identifier for the communication session through which the read request message is received, and wherein the determining whether a computer terminal that generated the read request message is the same as the computer terminal that generated the computer identification message, based on comparison of the initial hierarchical cache latency signature vector to the updated hierarchical cache latency signature vector, comprises:

comparing the initial hierarchical cache latency signature vector, which was retrieved from the memory using the session identifier for the communication session through which the data request message is received, to the updated hierarchical cache latency signature vector.

8. The method of claim 7, further comprising:

performing the following to be concurrent in time with operations of a Session Initiation Protocol to establish the communication session with the computer terminal, the obtaining a session identifier for the communication session, and the performing the receiving through a network interface circuit of a computer identification message.

9. A computer authentication node comprising:

a processor; and a memory connected to the processor and storing program code executable by the processor to perform operations comprising:

receiving, from a computer terminal over a communication network, through a network interface circuit a computer identification message containing an initial hierarchical cache latency signature vector that contains associated sets of elapsed times and buffer sizes, the elapsed times indicating how long a processor of the computer terminal took to read data from buffer addresses, which include upper and lower boundaries of each of the buffer sizes, of buffers sequentially allocated in a hierarchical memory structure comprising a plurality of levels of cache memories that hierarchically cache data that is read by the processor from a main memory, receiving through the network interface circuit a read request message containing an updated hierarchical cache latency signature vector and a data address that is requested to be read, the updated hierarchical cache latency signature vector containing associated sets of elapsed times and buffer sizes, determining whether a computer terminal that generated the read request message is the same as the computer terminal that generated the computer identification message, based on comparison of the initial hierarchical cache latency signature vector to the updated hierarchical cache latency signature vector, and controlling whether permission is granted for the read request message to read data from the data address, based a result of the determination.

10. The computer authentication node of claim 9, wherein the controlling whether permission is granted for the read request message to read data from the data address, based a result of the determination, comprises:

responsive to determining that the initial hierarchical cache latency signature vector has a threshold level of similarity to the updated hierarchical cache latency signature vector, reading data from a content server using the data address, and communicating a data response message containing the data read from the content server through the network interface circuit toward the computer terminal that generated the read request message; and responsive to determining that the initial hierarchical cache latency signature vector does not have a threshold level of similarity to the updated hierarchical cache latency signature vector, discarding the data response message without reading the data addressed by the data address from the content server.

11. The computer authentication node of claim 9, wherein the determining whether a computer terminal that generated the read request message is the same as the computer terminal that generated the computer identification message, based on comparison of the initial hierarchical cache latency signature vector to the updated hierarchical cache latency signature vector, comprises:

comparing similarity of a numerical trend through associated sets of the elapsed times and the buffer sizes in the initial hierarchical cache latency signature vector to a numerical trend through associated sets of the elapsed times and the buffer sizes in the updated hierarchical cache latency signature vector.

12. The computer authentication node of claim 11, wherein the comparing similarity of a numerical trend through associated sets of the elapsed times and the buffer sizes in the initial hierarchical cache latency signature vector to a numerical trend through associated sets of the elapsed times and the buffer sizes in the updated hierarchical cache latency signature vector, comprises:

identifying a first set of locations where transitions in the numerical trend through associated sets of the elapsed times and the buffer sizes in the initial hierarchical cache latency signature vector satisfy a defined rule;

identifying a second set of locations where transitions in the numerical trend through associated sets of the elapsed times and the buffer sizes in the updated hierarchical cache latency signature vector satisfy the defined rule; and determining whether the first set of locations are within a threshold distance of the second set of locations.

13. The computer authentication node of claim 12, wherein:

the identifying a first set of locations where transitions in the numerical trend through associated sets of the elapsed times and the buffer sizes in the initial hierarchical cache latency signature vector satisfy a defined rule, comprises identifying locations where slopes of the numerical trend through the associated sets of the elapsed times and the buffer sizes in the initial hierarchical cache latency signature vector change by a threshold value determined based on the defined rule; and the identifying a second set of locations where transitions in the numerical trend through associated sets of the elapsed times and the buffer sizes in the updated hierarchical cache latency signature vector satisfy the defined rule,
comprises identifying locations where slopes of the numerical trend through the associated sets of the elapsed times and the buffer sizes in the updated hierarchical cache latency signature vector change by the threshold value determined based on the defined rule.

14. The computer authentication node of claim 9, wherein the operations performed by the processor further comprise:
receiving a registration request message containing a computer terminal identifier;
selecting a set of buffer sizes from among sets of buffer sizes based on the computer terminal identifier;
communicating a registration response message directed to the computer terminal identifier, the registration response message containing the set of buffer sizes that was selected;
receiving the computer identification message responsive to the communication of the registration response message; and
storing the initial hierarchical cache latency signature vector in memory with a logical association to the computer terminal identifier.

15. The computer authentication node of claim 9, wherein the operations performed by the processor further comprise:
responsive to operations to establish a communication session through the network interface circuit with a computer terminal,
obtaining a session identifier for the communication session,
performing the receiving through a network interface circuit of a computer identification message, and
storing the initial hierarchical cache latency signature vector in memory with a logical association to the session identifier,
wherein the receiving through the network interface circuit a read request message containing an updated hierarchical cache latency signature vector and a data address that is requested to be read, comprises:
identifying a session identifier for a communication session through which the read request message is received; and
retrieving the initial hierarchical cache latency signature vector from the memory using the session identifier for the communication session through which the read request message is received, and
wherein the determining whether a computer terminal that generated the read request message is the same as the computer terminal that generated the computer identification message, based on comparison of the initial hierarchical cache latency signature vector to the updated hierarchical cache latency signature vector, comprises:
comparing the initial hierarchical cache latency signature vector, which was retrieved from the memory using the session identifier for the communication session through which the data request message is received, to the updated hierarchical cache latency signature vector.

16. The computer authentication node of claim 15, wherein the operations performed by the processor further comprise:
performing the following to be concurrent in time with operations of a Session Initiation Protocol to establish the communication session with the computer terminal,
the obtaining a session identifier for the communication session, and
the performing the receiving through a network interface circuit of a computer identification message.

* * * * *